(12) United States Patent
Okitsu et al.

(10) Patent No.: US 9,008,843 B2
(45) Date of Patent: Apr. 14, 2015

(54) POSITIONING APPARATUS FOR ACTUATOR WITH WAVE GEAR DEVICE

(75) Inventors: Yoshifumi Okitsu, Nagano (JP); Masafumi Yamamoto, Nagano (JP); Yuki Kato, Nagano (JP); Makoto Iwasaki, Aichi (JP)

(73) Assignees: Harmonic Drive Systems Inc., Tokyo (JP); National University Corporation Nagoya Institute of Technology, Aichi (JP)

( * ) Notice: Subject to any disclaimer, the term of this patent is extended or adjusted under 35 U.S.C. 154(b) by 513 days.

(21) Appl. No.: 13/449,051

(22) Filed: Apr. 17, 2012

(65) Prior Publication Data
US 2012/0271459 A1 Oct. 25, 2012

(30) Foreign Application Priority Data
Apr. 20, 2011 (JP) .................. 2011-094508

(51) Int. Cl.
*G05B 15/00* (2006.01)
*G05B 5/01* (2006.01)
(Continued)

(52) U.S. Cl.
CPC .................................. *G05B 13/041* (2013.01)

(58) Field of Classification Search
CPC ..................................... G05B 13/041
USPC ........................................ 700/275
See application file for complete search history.

(56) References Cited

U.S. PATENT DOCUMENTS

2009/0200979 A1* 8/2009 Sasaki et al. .................. 318/632

FOREIGN PATENT DOCUMENTS

JP 2009-187404 A 8/2009
JP 2010112306 A * 5/2010

OTHER PUBLICATIONS

Korondi et al. "Direct Torsion Control of Flexible Shaft in an Observer-Based Discrete-Time Sliding Mode" from "IEEE Transactions on Industrial Electronics, vol. 45, No. 2, Apr. 1998".*

(Continued)

*Primary Examiner* — Mohammad Ali
*Assistant Examiner* — Yuhui R Pan

(57) ABSTRACT

In a positioning apparatus for an actuator, a sliding mode controller for compensating for nonlinear characteristics of a wave gear device of the actuator generates a control input u to a controlled object, based on a position command $\theta_l^*$ and a state variable x for expressing the controlled object. The controlled object is defined in the following formula.

$$\dot{x} = Ax + Bu + E\theta_l^*$$

$$y = Cx$$

The switching surfaces of the sliding mode control system are defined by a variable S expressed in the following formula.

$$S = B^T P$$

The control input u is the sum of the linear-state feedback control term $u_l$ and the nonlinear control input $u_{nl}$ $$u = u_l + u_{nl}$$
$$= -(SB)^{-1}(SAx + SE\theta_l^*) - k(SB)^{-1}\frac{\sigma}{|\sigma|}$$

$$\sigma = Sx,$$

where σ is the switching function, and k is the switching gain.

1 Claim, 9 Drawing Sheets

(POSITIONING APPARATUS USING SLIDING MODE CONTROL SYSTEM)

(51) Int. Cl.
  *G05D 23/275* (2006.01)
  *G05B 13/04* (2006.01)

(56) References Cited

OTHER PUBLICATIONS

Hara, Chida, Nonami, and Saeki: "The Benchmark Problem for Robust Control (II)—A Design Example of a Positioning Control System," Journal of the Society of Instrument and Control Engineers, vol. 34, No. 6, pp. 498-507, (1995).
K. Sato, et al.: "Dynamic and Precision Rotational Positioning Control of a Mechanism with a Harmonic Speed Reducer," The JSME international journal series C, vol. 65, No. 629, pp. 167-172, (1999).
M. Iwasaki, et al.: "Disturbance Observer-Based Nonlinear Friction Compensation and Application to Table Drive System," T.IEE Japan, vol. 118-D, No. 1, pp. 51-57, (1998).
Nonami and Den: "Sliding Mode Control—Design Theory for Nonlinear Robust Control," Corona Publishing Co., Ltd, (1994).
Nonami, Nishimura, and Hirata: "Control System Design for MATLAB," Tokyo Denki University Publishing, (1998).
S. Hashimoto, et al.: "A Control Method of Ultrasonic Actuator-Driven Precision Stages Based on Stick-Slip Compensation and Continuous-Path Tracking," T.IEE Japan, vol. 125-D, No. 6, pp. 582-589, (2005).
S. Yanabe, et al.: "Rational Transmission Error of Harmonic Drive Device," The JSME international journal series C, vol. 56, No. 521, pp. 148-153, (1990).
T. Hidaka, et al.: "Torsional Vibration in the Robot Due to Wave Gears," The JSME international journal series C, vol. 52, No. 480, pp. 2207-2212, (1986).
T. Mizuno, et al.: "Mathematical Modeling of Angular Transmission Error by Gear Accuracy of Harmonic Drive Gearing," Tokai-Section Joint Conference of the 8 Institutes of Electrical and Related Engineers, p. 140 (2007).
Y. Kiyosawa, and J. Kurogi: "Introduction of Ultra Flat Strain Wave Gearing," The JSME international conference on motion and power transmissions, vol. 2004, pp. 76-79, (2004).
M. Kainuma, et al.:"Compensation for Nonlinear Characteristics in Harmonic Drive Gearings by Exact Linearization Method", Mar. 8, 2010, The papers of Technical Meeting on Industrial Instrumentation and Control, IEE Japan, IIC-10-034.

* cited by examiner (CONSTITUENT ELEMENTS OF A WAVE GEAR DEVICE)

(OUTLINE OF EXPERIMENTAL DEVICE)

(MEASURED AND MODELED RESULTS OF FRICTION CHARACTERISTIC)

(MODELED RESULTS OF NONLINEAR SPRING)

(MODELED RESULTS OF SYNCHRONOUS COMPONENT OF RELATIVE ROTATION)

(POSITIONING APPARATUS USING SLIDING MODE CONTROL SYSTEM)

(CONTROLLED OBJECT)

(RESPONSE EXAMPLE BASED ON SLIDING MODE CONTROL SYSTEM)

(RESULTS OF POSITIONING RESPONSE)

POSITIONING APPARATUS FOR ACTUATOR WITH WAVE GEAR DEVICE

TECHNICAL FIELD

The present invention relates to a positioning apparatus for an actuator configured so that the output rotation of a motor is reduced by a wave gear device and outputted from a load shaft. More specifically, the present invention relates to a positioning apparatus for an actuator provided with a wave gear device in which compensation for nonlinear characteristics is performed by sliding mode control in order to construct a robust control system to protect against the degradation of positioning control performance of the load shaft due to nonlinear characteristics of the wave gear device.

BACKGROUND ART

As shown in FIG. 1, typical wave gear devices are constructed of three fundamental components referred to as a circular spline CS (hereinafter also referred to as a "CS") which is a ring-shaped rigid body having teeth carved into the inner circumference of the ring; a flexspline FS (hereinafter also referred to as an "FS") which is a thin cup-shaped component having teeth carved into the outer circumference of the open part of the cup; and a wave generator WG (hereinafter also referred to as a "WG") which is an elliptical cam and a wave generator (Non-patent Document 1). The FS uses a flexible metal, flexibly deforms in accompaniment with the rotation of the WG, and is a special reduction gear in which the meshing position with the CS moves to thereby transmit drive power. Wave gear devices are frequently used in industrial robots or the like because the devices have a high reduction ratio, high torque, no backlash, and other characteristics.

Wave gear devices make use of elastic deformation of metal, and the flexspline FS therefore behaves as a nonlinear spring having hysteresis and has a substantial effect on positioning response performance (Non-patent Document 2). Moreover, an angular transmission error occurs in synchrony with the relative rotation of every constituent part due to machining and assembly errors of the gears, producing steady-state errors of the output shaft and vibrations during transitions (Non-patent Document 3). In addition, it has been pointed out that compensation must be made for nonlinear friction produced in the portions of the device in contact with each other (Non-patent Document 4).

Nonlinear FF compensation based on strict linearization has been proposed in response to problems related to nonlinear elements (Non-patent Document 5, Patent Document 1). In this method, strict linearization is performed without approximation of a nonlinear state equation by expanding a state equation into an equation that includes nonlinear characteristics, and performing linearized feedback and input conversion. However, this method is an FF compensation method that presupposes a model-base, and a problem therefore arises in that modeling errors are directly influenced by compensation accuracy. Non-patent Documents 6 to 11 are art related to the present invention.

LIST OF PRIOR ART DOCUMENTS

Patent Document 1: Japanese Laid-open Patent Publication No. 2009-187404
Non-patent Document 1: Y. Kiyosawa, and J. Kurogi: "Introduction of Ultra Flat Strain Wave Gearing," The JSME international conference on motion and power transmissions, Vol. 2004, pp. 76-79, (2004).
Non-patent Document 2: T. Hidaka, M. Sasahara, Y. Tanioka, and K. Okada: "Torsional Vibration in the Robot Due to Wave Gears," The JSME international journal series C, Vol. 52, No. 480, pp. 2207-2212, (1986) (in Japanese).
Non-patent Document 3: S. Yanabe, A. Ito, A. Okamoto, T. Yamaguchi, M. Ikeda, and H. Fujita: "Rotational Transmission Error of Harmonic Drive Device," The JSME international journal series C, Vol. 56, No. 521, pp. 148-153, (1990) (in Japanese).
Non-patent Document 4: K. Sato, J. Zheng, T. Tanaka, and A. Shimokohbe: "Dynamics and Precision Rotational Positioning Control of a Mechanism with a Harmonic Speed Reducer," The JSME international journal series C, Vol. 65, No. 629, pp. 167-172, (1999) (in Japanese).
Non-patent Document 5: M. Kainuma, M. Yamamoto, and M. Iwasaki: "Compensation for Nonlinear Characteristics in Harmonic Drive Gearings by Exact Linearization Method," The Papers of Technical Meeting on Industrial Instrumentation and Control, IEE Japan, IIC-10-034.
Non-patent Document 6: T. Mizuno, M. Yamamoto, M. Iwasaki, M. Kawafuku, H. Hirai, Y. Okitsu, K. Sasaki, and T. Yajima: "Mathematical Modeling of Angular Transmission Error by Gear Accuracy of Harmonic Drive Gearing," Tokai-Section Joint Conference of the 8 Institutes of Electrical and Related Engineers, 0-140 (2007) (in Japanese).
Non-patent Document 7: Nonami and Den: "Sliding Mode Control—Design Theory for Nonlinear Robust Control," Corona Publishing Co., Ltd, (1994) (in Japanese).
Non-patent Document 8: Nonami, Nishimura, and Hirata: "Control System Design for MATLAB," Tokyo Denki University Publishing, (1998) (in Japanese).
Non-patent Document 9: Hara, Chida, Nonami, and Saeki: "The Benchmark Problem for Robust Control (II)—A Design Example of a Positioning Control System," Journal of the Society of Instrument and Control Engineers, Vol. 34, No. 6, pp. 498-507, (1995) (in Japanese).
Non-patent Document 10: M. Iwasaki, T. Shibata, and N. Matsui: "Disturbance Observer-Based Nonlinear Friction Compensation and Application to Table Drive System," T.IEE Japan, Vol. 118-D, No. 1, pp. 51-5, (1998) (in Japanese).
Non-patent Document 11: S. Hashimoto, K. Ohishi, K. Kosaka, T. Ishikawa, H. Kubota, and T. Ohmi: "A Control Method of Ultrasonic Actuator-Driven Precision Stages Based on Stick-Slip Compensation and Continuous-Path Tracking," T.IEE Japan, Vol. 125-D, No. 6, pp. 582-589, (2005) (in Japanese).

DISCLOSURE OF THE INVENTION

An object of the present invention, which was designed in view of the aforedescribed issues, is to provide a positioning apparatus for an actuator provided with a wave gear device capable of compensating for nonlinear characteristics of the wave gear device by sliding mode control.

In the positioning apparatus of the present invention, a friction characteristic, a nonlinear spring element, and the synchronous component of relative rotation that includes an angular transmission error are modeled as nonlinear characteristics in a wave gear device, and a sliding mode control system is designed on the basis of this model in order to compensate for nonlinear characteristics by sliding mode control. In addition, in a case in which the stick-slip phenomenon caused by static friction force is manifest, compensation is made for the phenomenon.

According to the positioning apparatus of the present invention, it was confirmed that an improvement in settling time and a smooth load shaft response can be obtained in comparison with a conventional P-PI control system. According to the present invention, a robust control system can therefore be constructed to protect against control performance degradation due to nonlinear characteristics in the wave gear device.

BEST MODE FOR CARRYING OUT THE INVENTION

1. Overview of the Experimental Device

Figure 1:
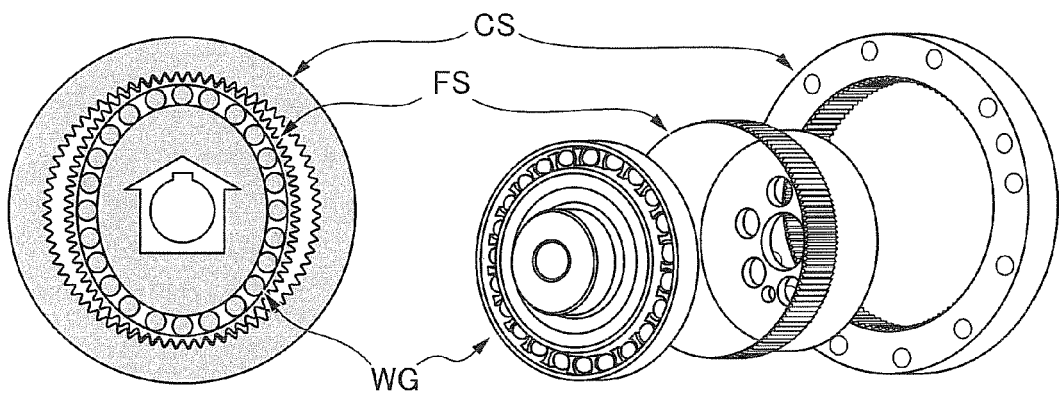
FIG. 1 is an explanatory view showing constituent elements of a typical wave gear device.
Figure 2:
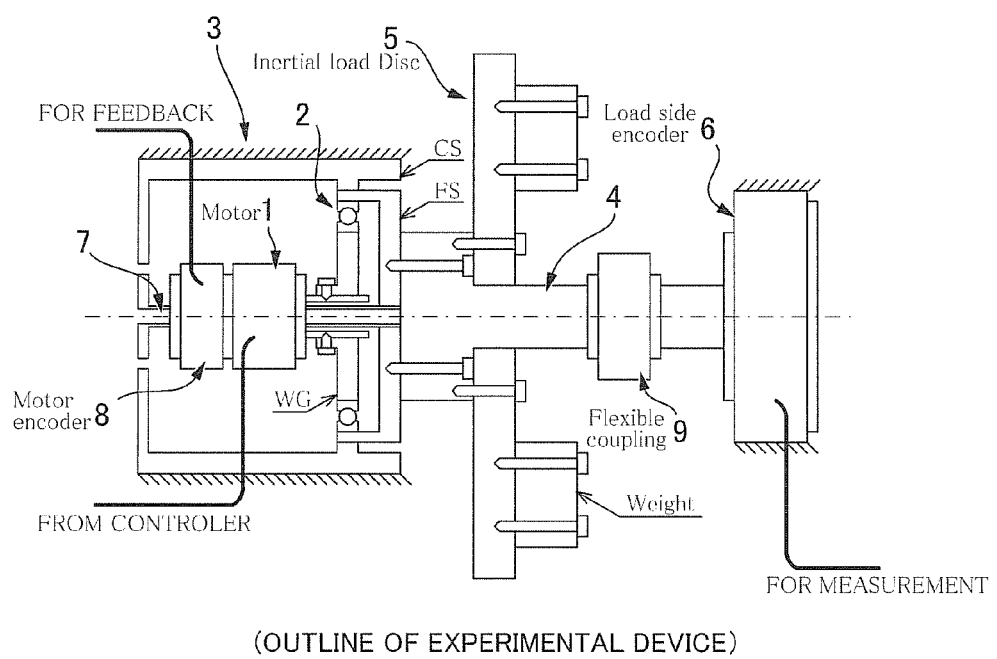
FIG. 2 is an explanatory view showing an example of a configuration of an experimental device (actuator to be controlled)

FIG. 2 is an explanatory view showing an example of a schematic configuration of an experimental device, which is the controlled object of the present invention, and the parameters thereof are shown in Table 1. An actuator 3 that includes a wave gear device 2 as a reduction gear in a motor 1 is the controlled object in the present invention. A full closed-loop control system is configured so that a load disk 5 and a load shaft encoder 6 are added to a load shaft 4 on the output end-side of the wave gear device 2, and motor shaft angle information from a motor shaft encoder 8 attached to a motor shaft 7 and load shaft angle information from the load shaft encoder 6 are provided as feedback to control the load shaft 4. A coupling 9 having sufficiently high rigidity is fastened between the load shaft 4 and the load shaft encoder 6 to prevent torsional vibration of the shaft.

TABLE 1

Parameters for Experimental Device

| | | |
|---|---|---|
| Gear ratio (N) | | 50 |
| Number of teeth (FS) | | 100 |
| Number of teeth (CS) | | 102 |
| Maximum electric current | [A] | 0.64 |
| Sampling time (Ts) | [s] | 0.0005 |
| Motor shaft encoder resolution | [pulse/rotation] | 8000 |
| Load shaft encoder resolution | [pulse/rotation] | 2880000 |

2. Modeling Nonlinear Characteristics in the Wave Gear Device

Modeling is performed for friction, a nonlinear spring element, and an angular transmission error, which are nonlinear characteristics of a wave gear device.

2.1 Modeling the Friction Characteristic

Figure 3:
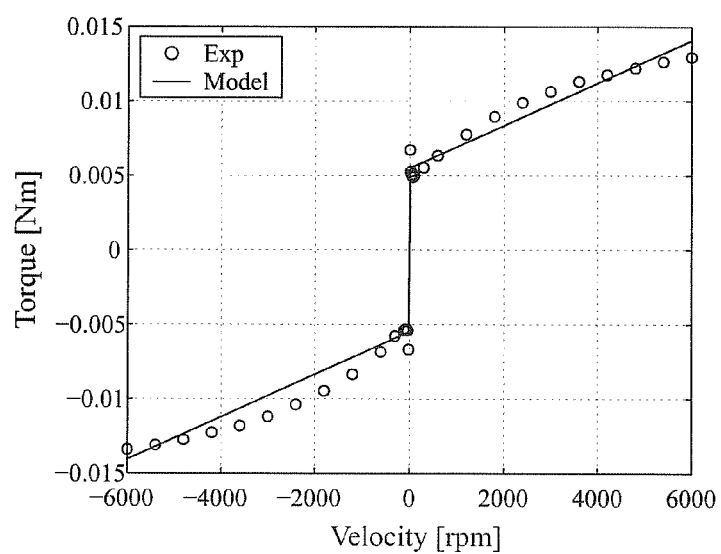
FIG. 3 is a graph showing the measured and modeled results of the friction characteristic.

In the present modeling, the friction characteristic is categorized into static friction that prevents the operation from restarting when the operation is at a standstill, Coulomb's friction that produces constant friction in the rotation direction, and viscous friction that is dependent on velocity. Measurements and modeling are performed herein by a constant speed test. Measured and modeled results of the friction characteristic are shown in FIG. 3. The friction characteristic model $\tau_{fric}$ is expressed in Mathematical Formula (1) by the sum of the force of Coulomb's friction and the force of viscous friction.

[Mathematical Formula 1]

$$\tau_{fric} = sgn(\omega_m)\tau_c + \omega_m \cdot D \quad (1)$$

In the formula, $\tau_c$ is the coefficient of Coulomb's friction, D is the coefficient of viscous friction, and $\omega_m$ is the motor shaft speed. The electric current command value was gradually increased during motor shaft standstill, and the force of the static friction was identified by such electric current command value as when the motor was rotated.

2.2 Modeling the Nonlinear Spring Element

The FS behaves as a nonlinear spring characteristic having hysteresis during positioning response because a flexible metal is used, and causes degradation in control performance. In order to measure the present characteristic, the motor shaft is servo-locked, and a constant torque is applied to the load end, whereby the torsion angle $\theta_{tw}$ at settling is measured. Here, the torsion angle $\theta_{tw}$ is expressed in Mathematical Formula (2).

[Mathematical Formula 2]

$$\theta_{tw} = \frac{\theta_m}{N} - \theta_l \quad (2)$$

Figure 4:
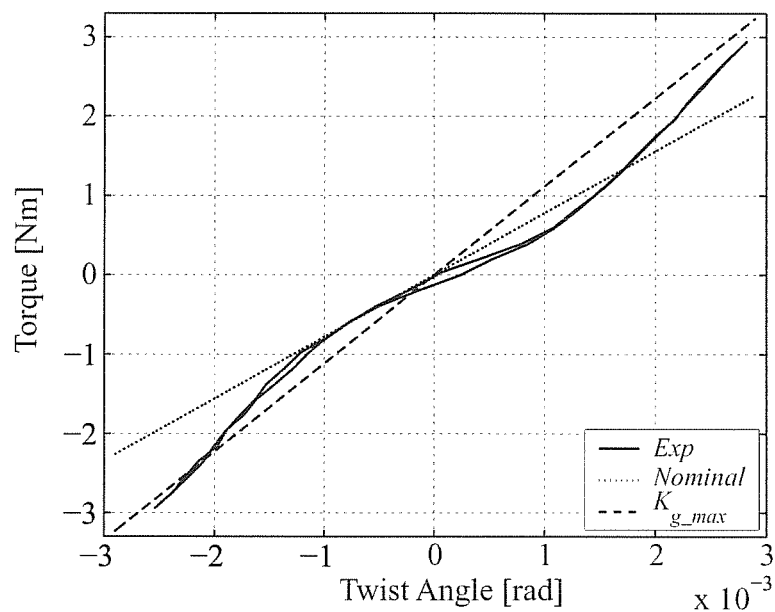
FIG. 4 is a graph showing the measured and modeled results of the nonlinear spring characteristic.

The measured results of the spring characteristic are shown by the solid line in FIG. 4. A nonlinear characteristic having a hysteresis characteristic can be confirmed based on the drawing. In the later-described sliding mode control system, the general form of the present characteristic will be treated as a modeling error of the spring constant without requiring a model capable of reproducing the general form of the present characteristic. The present characteristic is thus expressed in relation to the measured results of the experimental device shown in FIG. 4, and is expressed by the nominal model shown by the dotted line, and the spring model $K_{g\_max}$ when substantial twisting occurs between the load shaft and the motor shaft in which the modeling error shown by the dashed line is at a maximum.

2.3 Modeling the Angular Transmission Error

The angular transmission error $\theta_{TE}$ is the difference between the actual load shaft angle $\theta_l$ and the load shaft angle calculated from the motor shaft angle $\theta_m$, and is expressed in the following Mathematical Formula (3).

[Mathematical Formula 3]

$$\theta_{TE} = \theta_l - \frac{\theta_m}{N} \quad (3)$$

The angular transmission error (hereinafter referred to as the "synchronous component $\theta_{sync}$ of relative rotation") in the wave gear device is produced in synchrony with the relative rotation of the constituent parts due to the cumulative pitch error of the gears and the assembly error of the constituent parts (refer to Non-patent Document 6). In the case of the present object to be controlled, the present components can be categorized as components in synchrony with the motor shaft angle $\theta_m$, the load shaft angle $\theta_l$, and the relative rotation between the FS-WG on the basis of the fact that the CS is secured, and the synchronous component of relative rotation is expressed by combining the sine waves of these components.

A Fourier transformation is performed in which the time domain is replaced with an angle domain after the steady-state angular transmission error has been measured during the micro-feed angle positioning has been carried out for a single cycle of the load shaft, whereby the amplitude $A_k$; and the transfer $\phi_k$ of the integer harmonic of each of the components is calculated and modeled for the present components.

Figure 5:
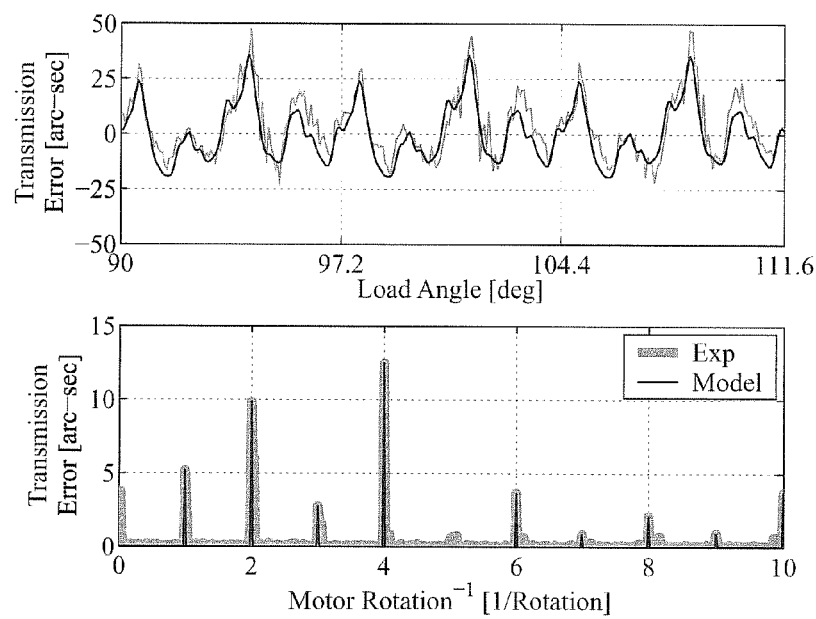
FIG. 5 is a graph showing the measured and modeled results of the synchronous component of relative rotation.

FIG. 5 shows the measured and modeled results for the synchronous component of relative rotation. The measured and modeled results of the angular transmission error for three cycles of the motor shaft when the micro-feed angle positioning has been carried out are shown in the upper drawing. The modeled results and the results from spectral analysis of the measured results in the upper drawing are shown in the lower drawing. The vertical axis in the drawing is the angular transmission error, and shows the error in arc-seconds in which one degree has 3600 divisions. The present components account for many of the components synchronized with the rotation of the motor shaft, and the present components are therefore expressed in the following Mathematical Formula (4) using only the harmonic components of the components synchronized with the motor shaft for modeling.

[Mathematical Formula 4]

$$\theta_{Sync}(\theta_m) = \sum_{k=0}^{n} A_k \cos(k\theta_m + \phi_k) \quad (4)$$

Here, the torsion angle $\theta_{tw}$ is expressed in the following Mathematical Formula 5.

[Mathematical Formula 5]

$$\theta_{tw} = \theta_l - \frac{\theta_m}{N} + \theta_{Sync}(\theta_m) \quad (5)$$

3. Designing the Sliding Mode Control System

Sliding mode control is a type of variable structure control, and desired characteristics are designed as switching surfaces. All of the quantities of state are thereby restricted to desired characteristics, and as a result, a robust control system can be constructed for nonlinear characteristics and uncertain systems (refer to Non-patent Document 7).

Figure 6:
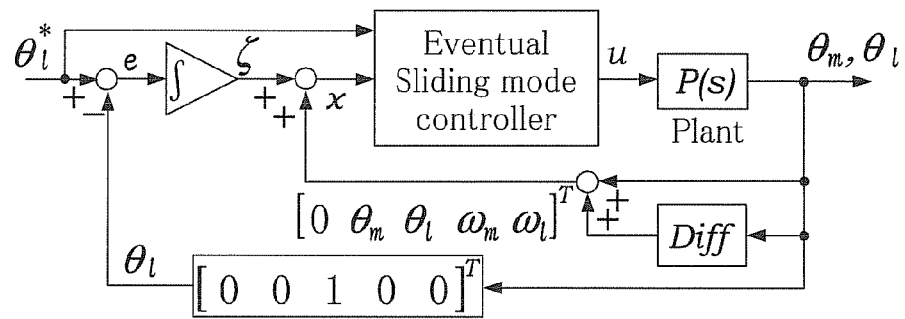
FIG. 6 is a block diagram of a positioning apparatus in which a sliding mode control system according to the present invention is used.

FIG. 6 shows a block diagram of a positioning apparatus in which a sliding mode control system is used. An object of the present invention is positioning, and a type-1 servo system is therefore constructed to control the load shaft position. The motor shaft speed $\omega_m$ and the load shaft speed $\omega_l$ are used for the speed calculated from the encoders of each of the shafts. In the positioning apparatus, a deviation e of a position command $\theta_l^*$ and a feedback value $\theta_l$ of the load shaft is computed in a subtracter, the deviation e is integrated by an integrator to compute an integral $\zeta$, and a state variable x expressing the controlled object is generated via an adder and inputted into a sliding mode controller. In the sliding mode controller, the position command $\theta_l^*$ and the state variable x are set as inputs, and a command input u to the actuator, which is the controlled object (Plant), is generated.

Figure 7:
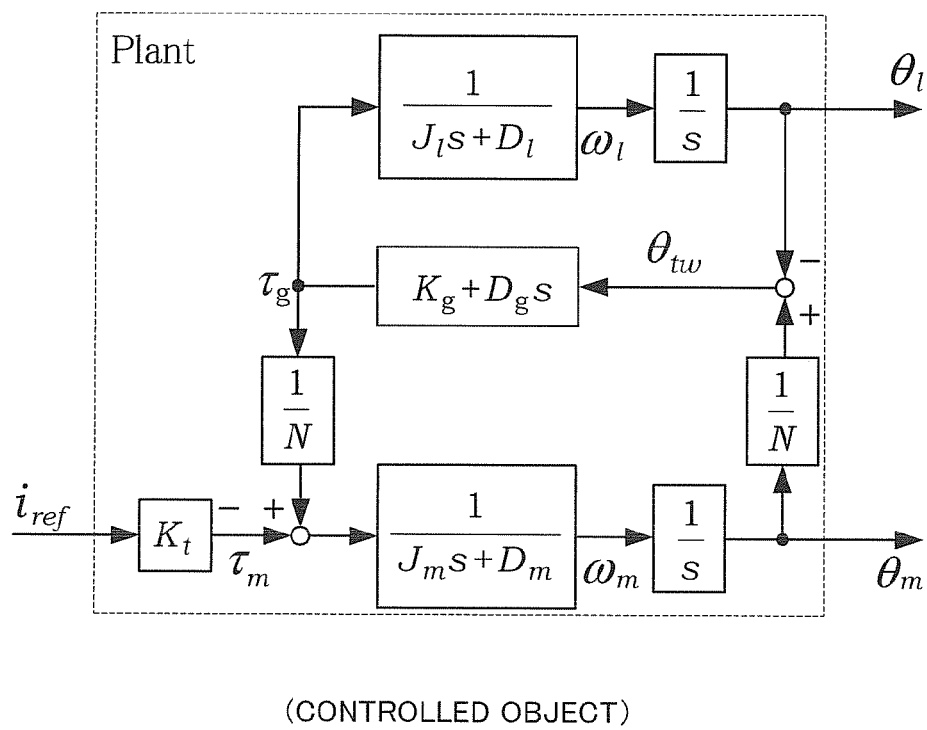
FIG. 7 is a block diagram showing a two-inertia model expressing the actuator to be controlled.

The controlled object (Plant) is expressed in a two-inertia model composed of a motor, a spring, and a load, as shown in FIG. 7. The meanings of the reference numerals in the drawing are as follows.

$J_m$: Motor shaft inertia
$D_m$: Viscous friction coefficient of motor shaft
N: Reduction ratio
$K_g$: Spring characteristic
$D_g$: Viscous friction coefficient of gear
$J_l$: Load shaft inertia
$D_l$: Viscous friction coefficient of load shaft
$K_t$: Torque constant The state equation of the present system is expressed in the following Mathematical Formula (6) on the basis of FIG. 7.

[Mathematical Formula 6]

$$\dot{x} = Ax + Bu + E\theta_l^* \quad (6)$$
$$y = Cx$$
$$x = [\zeta \ \theta_m \ \theta_l \ \omega_m \ \omega_l]^T$$
$$\zeta = \int (\theta_l^* - \theta_l) dt$$

$$A = \begin{bmatrix} 0 & 0 & -1 & 0 & 0 \\ 0 & 0 & 0 & 1 & 0 \\ 0 & 0 & 0 & 0 & 1 \\ 0 & -\frac{K_g}{J_m N^2} & \frac{K_g}{J_m N} & -\frac{D_m N^2 + D_g}{J_m N^2} & \frac{D_g}{J_m N} \\ 0 & \frac{K_g}{J_l N} & -\frac{K_g}{J_l} & \frac{D_g}{J_l N} & -\frac{D_l + D_g}{J_l} \end{bmatrix}$$

$$B = \begin{bmatrix} 0 & 0 & 0 & \frac{K_t}{J_m} & 0 \end{bmatrix}^T$$
$$E = \begin{bmatrix} 1 & 0 & 0 & 0 & 0 \end{bmatrix}^T$$
$$C = \begin{bmatrix} 0 & 1 & 0 & 0 & 0 \\ 0 & 0 & 1 & 0 & 0 \end{bmatrix}$$

In the present invention, the sliding mode control system is designed according to the following sequence.
 (1) Design the switching surfaces.
 (2) Design the sliding mode control system.
 (3) Establish the chattering suppression term.

3.1 Designing the Switching Surfaces

The switching surfaces determine the dynamics of the system, and linear control theory can be fundamentally applied to the design of the switching surfaces (refer to Non-patent Document 8). In the present invention, a matrix P derived from the Riccati equation shown in Mathematical Formula (7) is used in order to employ a zero point of the system to determine a matrix (design variable) S shown in Mathematical Formula (8).

[Mathematical Formula 7]

$$A_0^T P + P A_0 - P B B^T P + Q = 0 \quad (7)$$

[Mathematical Formula 8]

$$S = B^T P \quad (8)$$

where $$A_0 = A + \epsilon Q$$

ε and matrix Q are weighting factors, and in this case, a value is used for minimizing an evaluation function J shown in the following Mathematical Formula (9), which employs the weighting matrix Q of the diagonal matrix using the inherited algorithm.

[Mathematical Formula 9]

$$J = T_{set} + \alpha_{error} \quad (9)$$

$$\alpha_{error} = \frac{\sum_{k=0}^{k=T_{hys}} (\theta_l^*[k] - \theta_l[k])^2}{T_{hys}}$$

In the above formula, $T_{set}$ indicates the settling time, and $\alpha_{error}$ indicates the error area between the load shaft angle command $\theta_l^*$ and the load shaft angle $\theta_l$. $T_{hys}$ is the transient response time. For example, a 1000 sample is established by the settling time when the acceleration of the load shaft angle command is $4050°/s^2$. Accordingly, the weighting matrix Q and the weighting coefficient ε set the values in the following Mathematical Formulas (10) and (11).

[Mathematical Formula 10]

$$Q = \text{diag}(338.1\ 29.1\ 506.7\ 1.0\ 843.8) \quad (10)$$

[Mathematical Formula 11]

$$\epsilon = 89.0 \quad (11)$$

3.2 Designing the Sliding Mode Control System

As described above, the state quantities are constantly restricted to the established switching surfaces, and the sliding mode control system is therefore designed by a final sliding mode control method. In the final sliding mode control method, the state of the system starts from an arbitrary initial value, the sliding mode is not produced until the value reaches the sliding mode domain $S_O$, and the value is switched over to the sliding mode after arriving at the $S_O$ domain (refer to Non-patent Document 8). The control input u is the sum of the linear-state feedback control term $u_l$ and the nonlinear control input term $u_{nl}$, and can be expressed in the following Mathematical Formula (12).

[Mathematical Formula 12]

$$u = u_l + u_{nl} \quad (12)$$
$$= -(SB)^{-1}(SAx + SE\theta_l^*) - k(SB)^{-1}\frac{\sigma}{|\sigma|}$$
$$\sigma = Sx.$$

The variable k in the second term on the right-hand side of Mathematical Formula (12) is the switching gain. If $A_g$ is the A matrix when the modeling error of the spring model $K_g$ is at a maximum, that is, when $K_{g\_max}$ is the spring constant, and the disturbance term is the maximum reaction force torque $K_{g\_max} \cdot \theta_{sync\_max}$ caused by the synchronous component of relative rotation and the force of Coulomb's friction $\tau_m(\omega_m)$, $\tau_l(\omega_l)$ in the motor shaft and the load shaft, then k can be expressed in the following Mathematical Formula (13) (refer to Non-patent Document 9).

[Mathematical Formula 13]

$$k > |S(A_g - A)| + |SFd_{max}| \approx 1600 \quad (13)$$

$$Fd_{max} = \begin{bmatrix} 0 \\ 0 \\ 0 \\ -\frac{1}{J_m N}\{\tau_m(\omega_m) + K_{g\_max}\theta_{sync\_max}\} \\ \frac{1}{J_l N}\{\tau_l(\omega_l) + K_{g\_max}\theta_{sync\_max}\} \end{bmatrix}$$

For example, k=1800 is established as a value that satisfies Mathematical Formula (13).

3.3 Establishing a Term for Suppressing Chattering

The switching frequency of the nonlinear control input $u_{nl}$ is set to infinity, and the state quantities therefore vibrate at a high frequency (chattering) near the switching surfaces (refer to Non-patent Documents 7 and 8). In view of this, a nonlinear control input such as that shown in the following Mathematical Formula (14) is generated, whereby chattering is suppressed and input is smoothed.

[Mathematical Formula 14]

$$u_{nl} = -k(SB)^{-1}\frac{\sigma}{|\sigma| + \eta} \quad (14)$$

The value of the chattering suppression term η shown in Mathematical Formula (14) is determined as follows.

Figure 8:
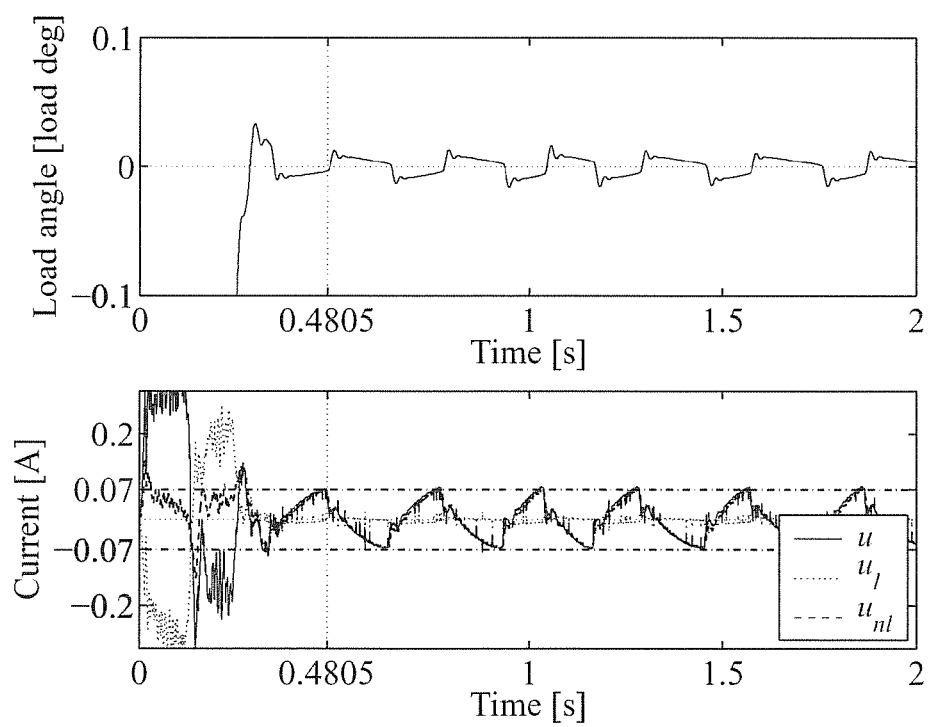
FIG. 8 is a graph showing a response example when positioning is performed by the sliding mode control system of the present invention.

3.4 Construction of Nonlinear Control Input Term with Consideration Given to Static Friction A response example is shown in FIG. 8 in which motor shaft positioning has been performed for five rotations by the previously described sliding mode control system. The chattering suppression term η is established as the value at which chattering is not produced during transitions in which the influence of nonlinear elements and modeling errors of the spring characteristic increase. The upper drawing of FIG. 8 shows the motor shaft response; and in the lower drawing, the solid line shows the control input u, the dashed line shows the linear control input and the dotted line shows the nonlinear control input $u_{nl}$, respectively. The horizontal dotted-dashed line in the lower drawing of FIG. 8 indicates ±0.07 A, and the vertical dotted line indicates 0.4805 s.

The stick-slip phenomenon in which the motor shaft repeatedly reverses the operating direction occurs directly after the electric current command value reaches ±0.07 A at the time of 0.4805 s in FIG. 8 (refer to Non-patent Documents 10 and 11). It is thought that this occurs because the established chattering suppression term η is established as a value at which chattering does not occur during the transitions where the influence of the modeling error of the spring characteristic and the angular transmission error is great, and compensation for static friction is therefore difficult near the positioning target angle.

In view of this, as shown in Mathematical Formula (15), the value of the chattering suppression term is modified using the torsion angle, whereby the chattering suppression term η increases during transitions where the influence of the modeling error of the spring characteristic increases, and the chattering suppression term η decreases during settling of the target angle where the influence of nonlinear friction is great, resulting in compensation for nonlinear characteristics.

[Mathematical Formula 15]

$$u_{nl} = -k(SB)^{-1}\frac{\sigma}{|\sigma|+\eta(\theta_{tw})} \quad (15)$$

$$\eta(\theta_{tw}) = \eta_v \frac{\theta_{tw}}{\theta_{tw\_max}} + \eta_{offset}$$

The angle $\theta_{tw\_max}$ is the maximum torsion angle, the motor shaft is servo-locked, and 600 arc-seconds is set as the torsion angle when maximum torque is applied to the load shaft. On the other hand, $\eta_{offset}$ is the chattering suppression steady-state term, and this value is decided under the conditions shown in the following Mathematical Formula (16) in order to restart the operation more quickly than accumulation carried out by the integrator when the motor shaft is at a standstill.

[Mathematical Formula 16]

$$\eta_{offset} = \left(\frac{k(SB)^{-1}}{I_{static}} - 1\right) S(1)\theta_{static} T_s \cdot T_{move} \quad (16)$$

The variables $\theta_{static}$ and $I_{static}$ are the load shaft angle and the static friction force when the operation is at a standstill, and $\theta_{static}$ is set to 0.0139 load degrees, which is the load angle when the operation is at a standstill during the occurrence of the stick-slip phenomenon, and $I_{static}$ is set to 0.07 A. The value $T_{move}$ is the time required to restart the operation. Chattering more readily occurs when this value is too small, and restarting the operation occurs more slowly when this value is too great. This time, the value is set to 20 samples so as to be capable of restarting the operation more quickly than the integrator. The value $\eta_{offset}$ is thereby set to 1.72. The value $\eta_v$ is set to a value at which chattering does not occur during transitions, and is determined to be a value 20 times that of $\eta_{offset}$.

4. Verification of the Effectiveness of the Control System of the Present Invention on the Basis of an Actual Experiment In order to comparatively verify the effectiveness of the control system of the present invention, a P-PI control system was separately constructed, and a continuous unidirectional positioning operation (feed frequency: 240 cycles, interval: 2 s) having a feed angle of 36 load degrees was performed. Bang-bang compensation was used as the static friction for the static friction compensation in the P-PI control system.

Figure 9:
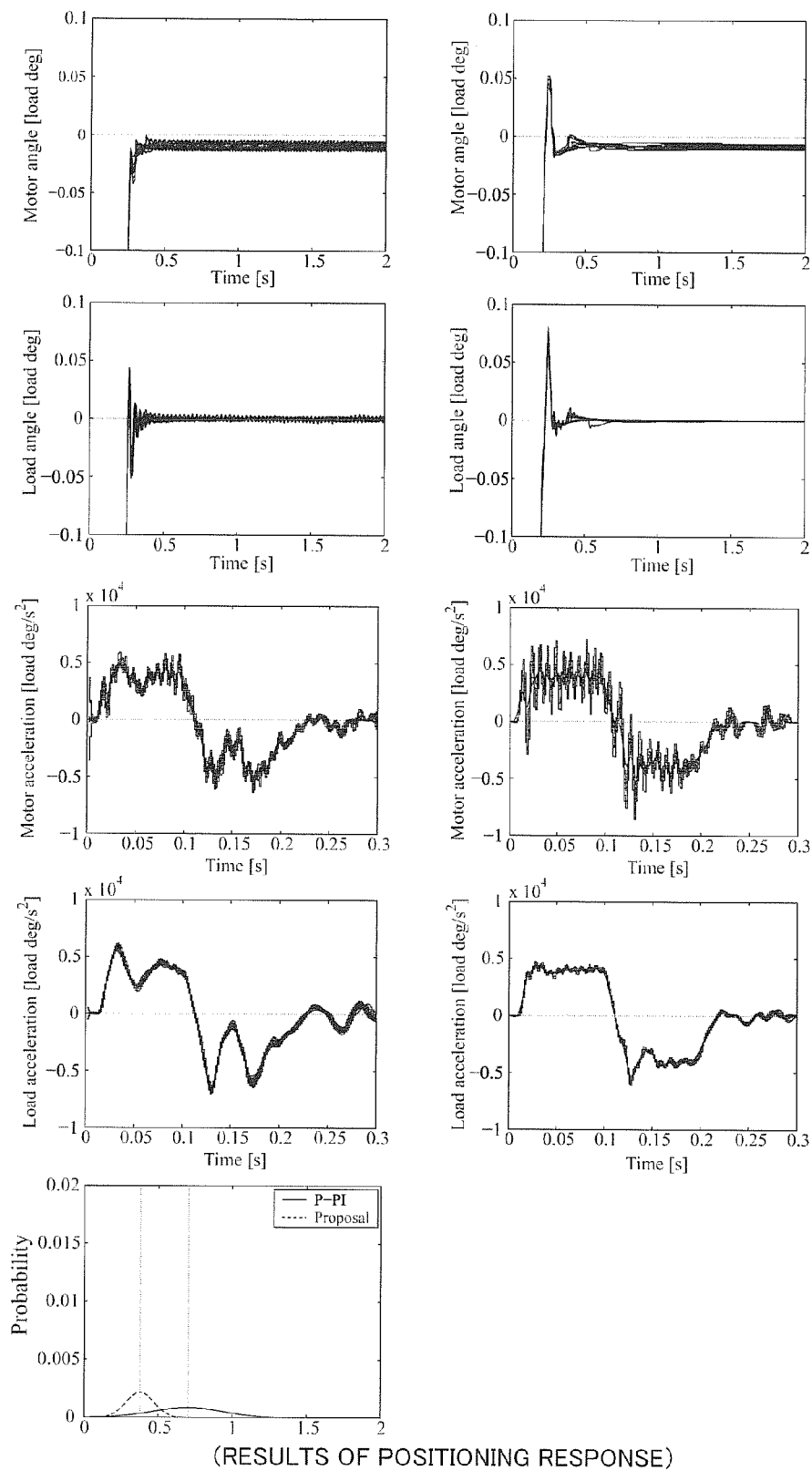
FIG. 9 is a graph showing comparative results of a positioning response of the sliding mode control system of the present invention and a P-PI control system.

FIG. 9 shows the motor shaft response and the load shaft response near the target angle in the first and second sets of drawings, respectively; the acceleration response of the motor shaft and the load shaft in the third and fourth sets of drawings, respectively; and the settling time distribution in a settling range of ±0.0045 load degrees in the fifth set of drawings. The left side of FIG. 9 shows the response when the P-PI control system is applied and the right side shows the response when the control system of the present invention is applied. In the fifth set of drawings in FIG. 9, the solid line shows the distribution of the P-PI control system, the dashed line shows the distribution when the control system of the present invention is used, and the vertical dotted line shows the average value. Table 2 shows the average value μ of the settling time and a value that is three times the standard deviation σ.

TABLE 2

Comparative Results of the Effectiveness of Compensating for Dynamic Characteristics

|  | P-PI | Control System of the Present Invention |
|---|---|---|
| μ [s] | 0.43 | 0.38 |
|  | 100.00 | 88.32 |
| 3σ [s] | 0.82 | 0.28 |
|  | 100.00 | 33.7 |

It is apparent from the first and second sets of drawings in FIG. 9 that the control system of the present invention converges with the target angle with greater accuracy than the P-PI control system. It is apparent from the fifth set of drawings in FIG. 9 that the average value of the settling time is improved in the control system of the present invention, and the response has less dispersion. In addition, it is apparent from Table 2 that the response could be reduced to 88% in terms of the average time and could be compressed to about 34% in terms of three times the standard deviation. Moreover, according to the third and fourth sets of drawings in FIG. 9, vibrations due to the influence of nonlinear elements during transitions can be observed in the motor shaft and the load shaft in the P-PI control system, but it is apparent that a smooth load shaft response is obtained as a result of compensating for nonlinear characteristics on the motor side in the control system of the present invention. The effectiveness of the control system of the present invention could be confirmed based on the aforedescribed results.

As described above, an object of the present invention is to construct a robust control system to protect against control performance degradation due to nonlinear characteristics in a wave gear device, and a positioning apparatus was proposed in which compensation for nonlinear characteristics is performed by sliding mode control. In the control system of the positioning apparatus of the present invention, the friction characteristic, the nonlinear spring element, and the synchronous component of relative rotation that includes an angular transmission error were modeled as nonlinear characteristics in a wave gear device, and a sliding mode control system was then designed. The stick-slip phenomenon caused by static friction force was observed, and a compensation method was proposed in response. When a full closed-loop positioning experiment was performed for the control system of the present invention, it was confirmed that improvements in settling time and a smooth response of the load shaft could be obtained in comparison with a P-PI control system.

The invention claimed is:

1. A positioning apparatus for an actuator, wherein the actuator has a motor, a wave gear device and a load shaft, and rotation of the motor is reduced in speed by the wave gear device and outputted from the load shaft, and wherein the motor is driven and controlled so that an angle position of the load shaft becomes an angle position given by a position command $\theta_l^*$ on the basis of a feedback value $\theta_l$ of the angle position of the load shaft and a feedback value $\theta_m$ of an angle position of a motor shaft of the motor, comprising:

a sliding mode controller which receives, as inputs, the position command $\theta_l^*$ and a state variable x for expressing the actuator of a controlled object, and generates and outputs a control input u to the motor; wherein the actuator of the controlled object is considered to be a two-inertia model composed of a motor, a spring, and a load; and is defined by a state equation expressed in Mathematical Formula (A)

$$\dot{x} = Ax + Bu + E\theta_l^* \quad \text{(A)}$$
$$y = Cx$$

where $$x = [\zeta \quad \theta_m \quad \theta_l \quad \omega_m \quad \omega_l]^T$$

$$\zeta = \int (\theta_l^* - \theta_l) dt$$

$$A = \begin{bmatrix} 0 & 0 & -1 & 0 & 0 \\ 0 & 0 & 0 & 1 & 0 \\ 0 & 0 & 0 & 0 & 1 \\ 0 & -\frac{K_g}{J_m N^2} & \frac{K_g}{J_m N} & -\frac{D_m N^2 + D_g}{J_m N^2} & \frac{D_g}{J_m N} \\ 0 & \frac{K_g}{J_l N} & -\frac{K_g}{J_l} & \frac{D_g}{J_l N} & -\frac{D_l + D_g}{J_l} \end{bmatrix}$$

$$B = \begin{bmatrix} 0 & 0 & 0 & \frac{K_t}{J_m} & 0 \end{bmatrix}^T$$

$$E = [1 \quad 0 \quad 0 \quad 0 \quad 0]^T$$

$$C = \begin{bmatrix} 0 & 1 & 0 & 0 & 0 \\ 0 & 0 & 1 & 0 & 0 \end{bmatrix}$$

where
- $\omega_l$: Load shaft speed
- $\omega_m$: Motor shaft speed
- $J_m$: Motor shaft inertia
- $D_m$: Viscous friction coefficient of motor shaft
- $N$: Reduction ratio of wave gear device
- $K_g$: Spring characteristic
- $D_g$: Viscous friction coefficient of gear
- $J_l$: Load shaft inertia
- $D_l$: Viscous friction coefficient of load shaft
- $K_t$: Torque constant;

switching surfaces in the sliding mode controller are defined by a matrix S expressed in Mathematical Formula (C) using a matrix P derived from a Riccati equation that is defined in Mathematical Formula (B)

$$A_0^T P + P A_0 - P B B^T P + Q = 0 \quad \text{(B)}$$

$$S = B^T P \quad \text{(C)}$$

where $$A_0 = A + \epsilon Q$$

- $\epsilon$: Weighting coefficient
- $Q$: Weighting matrix;

the sliding mode controller generates the control input u, which is the sum of a linear-state feedback control term ui and a nonlinear control input term $u_{nl}$, in accordance with a control law defined in Mathematical Formula (D)

$$u = u_l + u_{nl} \quad \text{(D)}$$
$$= -(SB)^{-1}(SAx + SE\theta_l^*) - k(SB)^{-1}\frac{\sigma}{|\sigma|}$$

$$\sigma = Sx,$$

where $\sigma$ is a switching function and k is a switching gain;

the nonlinear control input term $u_{nl}$ is defined in Mathematical Formula (F) using a chattering suppression term $\eta(\theta_{tw})$, which is a function of a torsion angle $\theta_{tw}$ $$u_{nl} = -k(SB)^{-1}\frac{\sigma}{|\sigma| + \eta(\theta_{tw})}; \quad \text{(F)}$$

the chattering suppression term $\eta(\theta_{tw})$ is defined in Mathematical Formula (G)

$$\eta(\theta_{tw}) = \eta_v \frac{\theta_{tw}}{\theta_{tw\_max}} + \eta_{offset}, \quad \text{(G)}$$

where $\eta_v$ is a constant value, $\theta_{tw\_max}$ is a maximum torsion angle, and $\eta_{offset}$ is a chattering suppression steady term; and the chattering suppression steady term $\eta_{offset}$ is defined in Mathematical Formula (H)

$$\eta_{offset} = \left(\frac{k(SB)^{-1}}{I_{static}} - 1\right) S(1)\theta_{static} T_s \cdot T_{move}, \quad \text{(H)}$$

where $\theta_{static}$ is a load shaft angle during operation standstill, $I_{static}$ is an electric current value corresponding to a static friction force during operation standstill, $T_s$ is a sampling time, and $T_{move}$ is an operation restart time.

\* \* \* \* \*